United States Patent [19]

Erdman

[11] Patent Number: 4,638,233
[45] Date of Patent: Jan. 20, 1987

[54] METHOD OF ESTABLISHING A PREFERRED RATE OF AIR FLOW, METHOD OF DETERMINING TORQUE, AND APPARATUS

[75] Inventor: David M. Erdman, Fort Wayne, Ind.

[73] Assignee: General Electric Company, Fort Wayne, Ind.

[21] Appl. No.: 791,026

[22] Filed: Oct. 24, 1985

[51] Int. Cl.⁴ .................... G05D 7/06; H02P 6/02
[52] U.S. Cl. .................... 318/644; 318/254; 318/439; 73/3; 73/168; 73/861
[58] Field of Search ............ 318/138, 254, 439, 644, 318/645, 650, 651; 73/3, 49.7, 168, 502, 503, 514, 861, 861.02, 861.08, 861.36, 861.38, 861.71, 861.77

[56] References Cited

U.S. PATENT DOCUMENTS

| | | | |
|---|---|---|---|
| 3,426,273 | 2/1969 | Kuntz et al. ............... | 73/3 |
| 3,517,308 | 6/1970 | Mirdadian ............... | 73/3 X |
| 3,550,426 | 12/1970 | Griffo ....................... | 73/3 |
| 3,765,234 | 10/1973 | Sievert ....................... | 73/168 X |
| 4,005,347 | 1/1977 | Erdman ..................... | 318/254 |
| 4,169,990 | 10/1979 | Erdman ..................... | 318/138 |
| 4,389,886 | 6/1983 | Korczak .................... | 73/168 |
| 4,390,826 | 6/1983 | Erdman et al. ............ | 318/439 |
| 4,449,079 | 5/1984 | Erdman ..................... | 318/138 |
| 4,467,657 | 8/1984 | Olsson ....................... | 73/3 X |

Primary Examiner—William M. Shoop, Jr.
Assistant Examiner—Bentsu Ro
Attorney, Agent, or Firm—Ralph E. Krisher, Jr.

[57] ABSTRACT

A method of determining torque of an electronically commutated motor arranged to drive a blower means for flowing air through a contained space with the electronically controlled motor and the blower means having a combined predetermined inertia. In practicing this method, power is applied to the electronically commutated motor, and the blower means is thereby accelerated to a predetermined speed. The power is then removed from the electronically commutated motor, and thereby the blower means is decelerated. The deceleration of the blower means is measured, and the torque of the electronically commutated motor is computed from the measured deceleration.

A method of establishing a preferred rate of air flow and apparatus are also disclosed.

19 Claims, 5 Drawing Figures

METHOD OF ESTABLISHING A PREFERRED RATE OF AIR FLOW, METHOD OF DETERMINING TORQUE, AND APPARATUS

FIELD OF THE INVENTION

This invention relates in general to systems for conditioning the temperature of a space and in particular to apparatus for conditioning the temperature of a space, a method of establishing a preferred rate of flow of air through at least a part of a system for conditioning the air regardless of the static pressure thereof, and a method of determining torque of an electronically commutated motor arranged to drive a blower means for flowing air through a contained space.

BACKGROUND OF THE INVENTION

In the past, various different schemes are believed to have been utilized in an attempt to flow air through a contained space of a system including an apparatus for conditioning the temperature of the air with the rate of such air flow being related to the static pressure associated with such system. Both the speed and torque of an electric motor in the apparatus and operable generally for driving a fan or blower of the apparatus to effect the air flow through the system are affected by the static pressure thereof, and the rate of air flow (CFM - cubic feet per minute) through the apparatus also affects the motor speed and torque. Thus, if the motor speed and torque were ascertained, the fan manufacturer's data then permitted the calculation of both the flow rate and the static pressure. Motor speed or torque by itself was not enough to determine flow rate or static pressure if the other was not known. In view of the foregoing, it is believed that one of the disadvantageous or undesirable features of the aforementioned past apparatus involved rather laboreous and time consuming attempts to match motor speed and torque with the proper fan to at least approximate the desired air flow rate for the particular contained space and static pressure of the particular past apparatus or the system in which such apparatus was employed.

Even if the aforementioned match of motor speed and torque with the proper fan might have been made thereby to attain the desired air flow rate for the contained space and static pressure of the past apparatus or system in which it was employed, such static pressure may have been altered during the operation of such system. For instance, it is believed the opening, closing or mere adjustment of a vent or the like connecting a conditioned space in air flow relation with the system affected the static pressure thereof. Therefore, it is believed that another of the disadvantageous of undesirable features of the past apparatus was that it was unable to accomodate variations in the static pressure thereof in the system in which the past apparatus was employed.

SUMMARY OF THE INVENTION

Among the several objects of the present invention may be noted the provision of an improved apparatus for conditioning the temperature of a space, an improved method of establishing a preferred rate of flow of air through a contained space of a system for conditioning the air regardless of the static pressure of the system, and an improved method of determining torque of an electronically commutated motor which overcome the aforementioned disadvantageous or undesirable features, as well as others, of the prior art; the provision of such improved methods and apparatus in which the rate of flow of air through the contained space is closely controlled; the provision of such improved methods and apparatus in which variations in the static pressure are readily accommodated; the provision of such improved methods and apparatus in which the deceleration of the electronically commutated motor and a fan driven thereby is measured from a preselected speed during at least a part of a measured period of time to determine the preferred rate of flow of air through the system; the provision of such improved methods and apparatus wherein the electronically commutated motor is deenergized during the at least part of the measured time period thereby to effect the coast down in speed of the electronically commutated motor and the fan; and the provision of such improved methods and apparatus having components utilized therein which are simple in design, easily assembled and economically manufactured. These as well as other objects and advantageous features of the present invention will be in part apparent and in part pointed out hereinafter.

In general, a method in one form of the invention is provided for establishing a preferred rate of flow of air through system for conditioning it regardless of the static pressure of the system. The system includes a blower means operable generally for flowing the air through at least a part of the system and an electronically commutated motor arranged to drive the blower means. In practicing this method, the electronically commutated motor is energized to at least a preselected speed, and thereby the blower means is driven to effect the flow of air through the at least part of the system. The electronically commutated motor is deenergized for a measured period of time, and thereby deceleration of the electronically commutated motor and the blower means is effected. The deceleration of the electronically commutated motor and the blower means is determined during at least a part of the measured time period, and the preferred rate of the flow of air through the system is ascertained at least in part from the determination of the deceleration of the electronically commutated motor and the blower means during the at least part of the measured time period.

Also in general and in one form of the invention, a method is provided for determining torque of an electronically commutated motor arranged to drive a blower means for flowing air through a contained space, the electronically commutated motor and the blower means having a combined predetermined inertia. In practicing this method, power is applied to the electronically commutated motor, and the blower means is accelerated thereby to a predetermined speed. The power is then removed from the electronically commutated motor, and thereby the blower means is decelerated. The deceleration of the blower means is measured, and the torque of the electronically commutated motor is computed from the measured deceleration.

Further in general, apparatus in one form of the invention is provided for establishing a preferred rate of flow of air through at least a part of a system for conditioning the temperature of the air. The apparatus has a heat exchanger, and fan means rotatable for blowing air past the heat exchanger through the at least part of the system. An electronically commutated motor includes a stationary assembly having a multi-stage winding arrangement with a plurality of winding stages adapted to be electronically commutated in at least one preselected sequence and at a plurality of commutation rates, and a permanent magnet rotor means associated in selective magnetic coupling relation with the winding stages is operable generally for rotatably driving the fan means in response to the electronic commutation of the winding stages in the at least one preselected sequence. Means is provided for electronically commutating at least some of the winding stages in the at least one preselected sequence and in one of the commutation rates to effect conjoint rotation of the permanent magnet rotor means and the fan means to at least a preselected speed. Means is provided for terminating the electronic commutation of the at least some winding stages for a measured period of time thereby to interrupt the selective magnetic coupling relation of the permanent magnet rotor means with the at least some winding stages and effect deceleration of the permanent magnet rotor means and the fan means is provided for determining the deceleration of the at least one of the permanent magnet rotor means and the fan means during at least a part of the measured period of time and for ascertaining the preferred rate of the flow of air past the heat exchanger through the at least part of the system at least in part from the determination of the deceleration of the permanent magnet rotor means and the fan means during the at least part of the measured period of time.

BRIEF DESCRIPTION OF THE DRAWINGS

Corresponding reference characters indicate corresponding parts through the several views of the drawings.

The exemplifications set out herein illustrate the preferred embodiments of the present invention in one form thereof, and such exemplifications are not to be construed as limiting either the scope of the disclosure or the scope of the invention in any manner.

DETAILED DESCRIPTION OF THE PREFERRED EMBODIMENT

Figure 1:
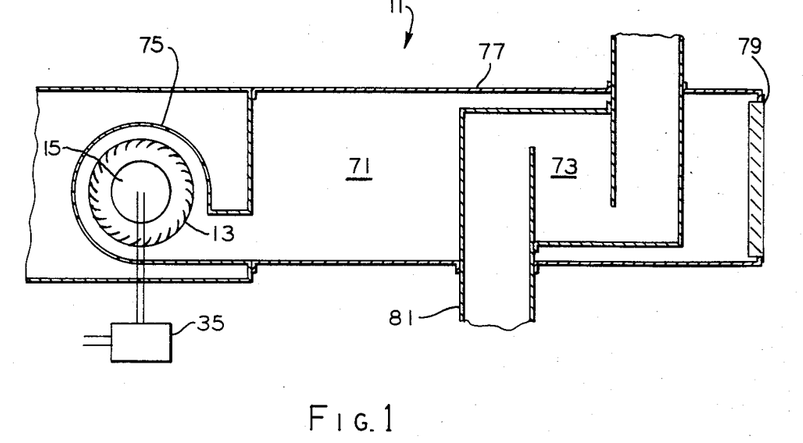
FIG. 1 is a schematic view showing apparatus in one form of the invention for conditioning the temperature of a space and illustrating principles which may be practiced in a method of establishing a preferred rate of flow of air through a system for conditioning the air regardless of the static pressure of the system also in one form of the invention.
Figure 2:
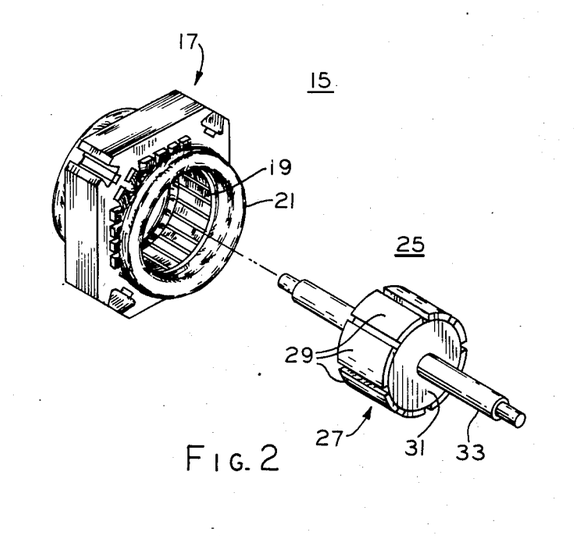
FIG. 2 is an exploded perspective view of a stationary assembly and a rotatable assembly of an electronically commutated motor utilized in the apparatus of FIG. 1.
Figure 3:
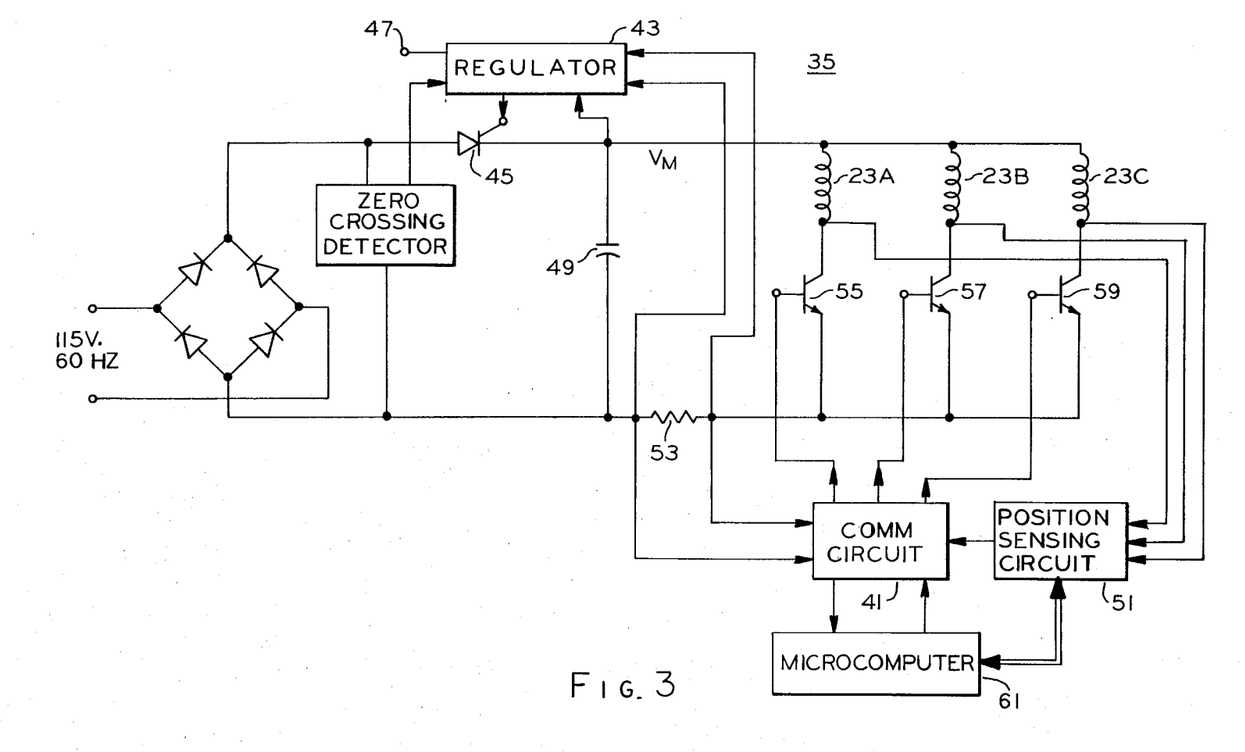
FIG. 3 is a diagrammatic view of a circuit showing the essential elements of a control for the electronically commutated motor in the apparatus of FIG. 1.
Figure 5:
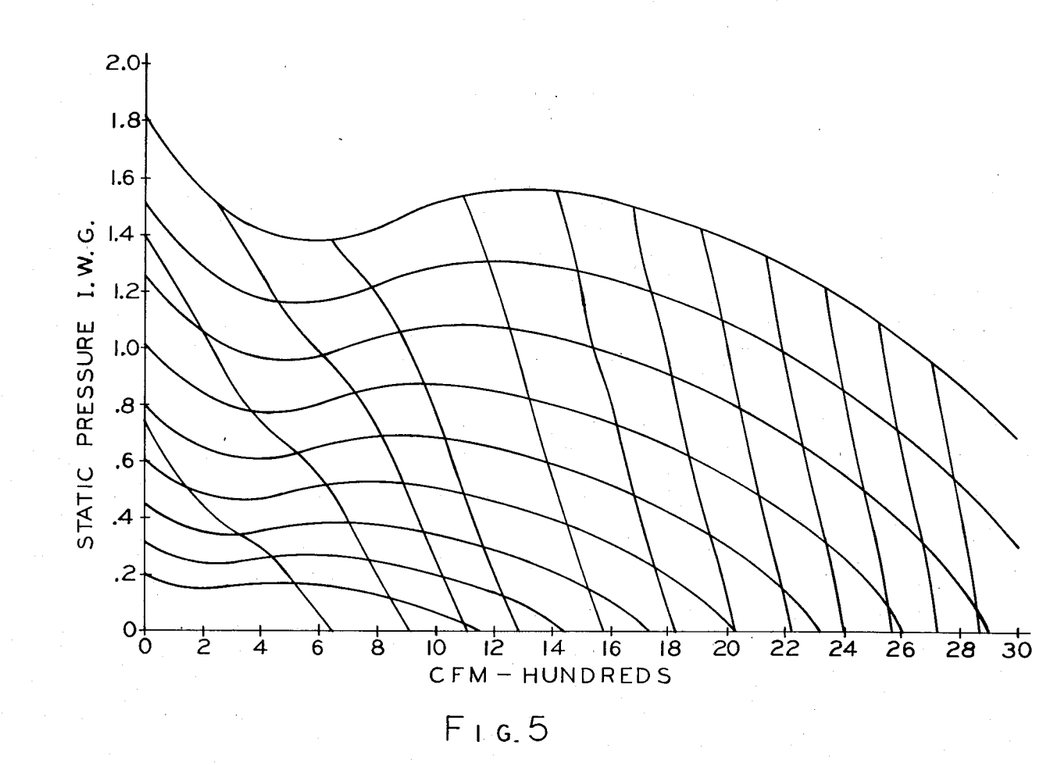
FIG. 5 is a graph illustrating the CFM (cubic feet per minute) of air flowed by the fan of the apparatus of FIG. 1 as a function of the speed and torque of the fan.

With reference to the drawings in general, there is illustrated a method in one form of the invention for establishing a preferred rate of flow of air through a system 11 for conditioning the temperature of the air regardless of the static pressure of the system (FIG. 1). System 11 includes a blower or fan means 13 operable generally for flowing the air through at least part of the system and an electronically commutated motor 15, hereinafter sometimes referred to as an ECM, arranged to drive the blower means (FIGS. 1 and 2). In practicing this method, ECM 15 is energized to at least a preselected speed, and thereby blower means 13 is driven to effect the flow of air through system 11 (FIGS. 1, 3 and 5). ECM 15 is deenergized for a measured period of time, and thereby deceleration of the ECM and blower means 13 is effected (FIGS. 1, 3 and 5). The deceleration of ECM 15 and blower means 13 is determined during at least a part of the measured time period, and the preferred rate of the flow of air through system 11 is ascertained at least in part from the determination of the deceleration of the ECM and the blower means during the at least part of the measured time period (FIGS. 3 and 5).

More particularly and with specific reference to FIG. 2, ECM 15 has a stationary assembly 17 which includes a core or stator 19 of suitable ferromagnetic material, and a multi-stage winding arrangement 21 having a plurality of winding stages 23A, 23B and 23C, as best seen in FIG. 3, adapted to be electronically commutated in at least one preselected sequence and in a plurality of commutating rates, as discussed in greater detail hereinafter. A rotatable assembly 25 of ECM 15 is rotatably arranged with stationary assembly 17 and comprises a permanent magnet rotor means 27 operable generally for driving blower means 13 and associated in selective magnetic coupling relation with winding stages 23 so as to be rotatably driven by the winding stages upon the electronic commutation thereof, as discussed in greater detail hereinafter. Permanent magnet rotor means 27 includes a plurality of magnet material elements 29 secured to a rotor 31 generally about the circumference thereof, and the rotor is secured to a shaft 33. Albeit not shown for the sake of drawing simplification and brevity of disclosure, rotor shaft 33 may be journaled by suitable bearings in a pair of opposite end frames forming a part of stationary assembly 17 of ECM 15. Furthermore, while ECM 15 is illustrated herein as having three winding stages 23, it is contemplated that an ECM having any convenient number of winding stages greater than one may be employed within the scope of the invention so as to meet at least some of the objects thereof. If a more detailed discussion of the construction and operation of an ECM, such as that indicated herein at 15, is desired, reference may be had to U.S. Pat. No. 4,005,347 issued Jan. 25, 1977 and U.S. Pat. No. 4,169,990 issued Oct. 2, 1979 both of which are incorporated herein by reference.

As a preliminary step in the practice of the establishing method of this invention, several factors or constants concerning blower means 13 and ECM 15 must be ascertained. For instance, the combined inertia of blower means 13 and permanent magnet rotor means 27 of ECM 15 must be determined, and this combined inertia is a measured constant which may be emperically determined during manufacture for each combination of blower means and permanent magnet rotor means, as is well known in the art. Furthermore, the residual torque of ECM 15 must also be determined, and this residual torque occasioned by bearing, windage and iron losses due to rotation of the permanent magnet material elements 29 of permanent magnet rotor means 27 are known from design data for the ECM, as is also well known to the art.

Subsequent to the determination of the above discussed constants, as described above, electrical power is supplied to ECM 15, and at least some of the winding stages 23 of ECM 15 are electronically commutated in the preselected sequence and at one of the commutation rates, and permanent magnet rotor means 27 is thereby associated in the aforementioned selective magnetic coupling relation with the electronically commutated winding stages so as to be rotatably driven thereby. Permanent magnet rotor means 27 rotates conjointly with fan means 13 which is driven thereby to at least a preselected speed in response to the electronically commutating action on the winding stages 23 of ECM 15. A control circuit or control means 35 for ECM 15 is shown in FIG. 3, and by reference to FIG. 4, it will be appreciated that the excitation applied to each of winding stages 23A, 23B and 23C is controlled by commutation control circuit 41.

In the circuit of FIG. 3, the angular velocity of permanent magnet rotor means 27 is regulated in accordance with a technique known as phase angle control. Zero crossovers of the 60 Hz line are detected and a signal is generated at a predetermined time interval thereafter, e.g., at a phase angle of 120°. The latter signal is applied to regulator 43 which responds by turning on a switch or switching means, such as an SCR 45 of the like for instance. Thus, the signal applied at terminal 47 which represents the desired performance of ECM 15, determines that power is to be supplied to winding stages 23A, 23B and 23C during a time interval corresponding to a 60° phase angle. A capacitor 49 filters the signal at the output of SCR 45 to produce an effective voltage $V_m$ which is applied to winding stages 23A, 23B, and 23C. It will be seen therefore, that a DC voltage is applied only during a 60° interval under the assumed operating conditions. Thus, where phase control is employed, the angular velocity of the rotatable assembly is controlled by preselecting the phase angle during which a DC voltage is applied to the winding stages 23A, 23B and 23C.

The control of the angular velocity of permanent magnet rotor means 27 may be further refined by means of voltage feedback, whereby $V_m$ is applied to regulator 43 for comparison against the signal derived from terminal 47. Since $V_m$ is representative of the actual angular velocity of permanent magnet rotor means 27, such velocity will vary with the difference between the compared signals. The resultant error signal is applied to SCR 45. If the amplitude of the error signal increases, SCR 45 is conductive for a longer time interval and the motor speeds up; however, if it decreases, SCR 45 is open for a shorter time interval, and the drag on permanent magnet rotor means 27, e.g. due to friction and the load on the machine, reduces the speed of ECM 15 until the desired angular velocity is reached.

The operation is not limited to the voltage feedback technique shown and discussed above. For example, a further way of providing closed loop regulation of the angular velocity of permanent magnet rotor means 27 is to compare the signal at terminal 47 with the back EMF signals applied to position sensing circuit 51, (or with a single combined back EMF signal), proportional to velocity of the permanent magnet rotor means. In this manner the extraneous factors introduced by the resistance and inductance of winding stages 23A, 23B and 23C is avoided, and a more closely regulated operation of the motor results.

The signal derived from a resistance or current shunt 53 is applied to commutation circuit 41 and thence to the base of each commutation transistor 55, 57, 59 as well as to regulator 43. While the regulation of $V_m$ is carried out by regulator 43 in the circuit illustrated, such action may not respond sufficiently quickly to an over-current condition. Accordingly, by applying the signal derived from resistance 53 to the bases of transistors 55, 57, 59 via commutation circuit 41, immediate corrective action is effected by rendering these transistors nonconductive and thereby interrupting the energization of winding stages 23A, 23B, 23C as long as the over-current condition persists. By suitably adjusting the settings of regulator 43, the signal derived from resistance 53 may be caused to take effect at a lower value with respect to the operation of SCR 45 than with respect to its direct application to commutation transistors 55, 57, 59. Thus, under normal operating condition, regulator 43 and SCR 45 will have sufficient time to control motor operation through the applied voltage $V_m$ when an over-current condition exists. Control through transistors 55, 57 and 59 is thus reserved for extreme situations only.

For a more complete description of the arrangement and operation of ECM control circuit 35 of FIG. 3, reference may be had to U.S. Pat. No. 4,390,826 which is hereby incorporated by reference. As disclosed therein, control circuit 35 operates in conjunction with position sensing circuit 51 for sensing the speed of permanent magnet rotor means 27 and for controlling the speed of blower means 13 operatively connected thereto. Position sensing circuit 51 provides a means for measuring the speed of permanent magnet rotor means 27 by counting the commutation pulses derived from each of winding stages 23A, 23B, 23C while said motor is operated. These pulses may be counted for a measured period of time utilizing a timing circuit of a type well known in the art. Typically the control of the commutation circuit 41 and other elements of ECM control circuit 35 will be implemented utilizing a microcomputer 61 which can be programmed to provide the correct signals necessary for operating the ECM system in response to either manual input commands, such as commands for desired volumes of air from blower means 13, or by actuating the system in response to particular temperature changes. The microcomputer system (not shown) which may be of a type well known in the art, includes the various timing apparatus necessary for establishing a time period over which the pulses provided by the position sensing circuit 51 may be counted in order to determine the rotational speed of permanent magnet rotor means 27 of ECM 15.

In the operation of the system 11, in order to control the speed and torque output of ECM 15, the normal operation, as shown in the aforementioned U.S. Patent, is to phase control the current waveform applied to stages 23A, 23B, 23C for controlling power output and varying the frequency of the current waveform in order to control the speed of permanent magnet rotor means 27. However, in the practice of the present invention, it is necessary to periodically interrupt power to winding stages 23A, 23B 23C for a predetermined number of commutation pulses in order to determine the torque reflected to the ECM 15 as a result of the load placed on blower means 13 in driving or blowing air through system 11. By deenergizing the winding stages of the ECM, permanent magnet rotor means 27 may be allowed to coast for a measured time interval or period and the commutation pulses occurring during that time interval are counted in order to determine the deceleration of the permanent magnet rotor means to a speed at which power is reapplied to the motor. Microcomputer 61 is then able to measure the deceleration of permanent magnet rotor means 27 by determining the time (T) for a predetermined number of commutation pulses to occur.

As is well known, the torque of a motor can be determined by computing the product of the inertia of the motor and the deceleration of the motor under load. This computation provides a value for the total torque imparted to the motor. The actual torque created by the blower means 13 and the air mass being moved by the blower means is computed by subtracting the residual torque of the motor, due to bearing, windage and iron losses, from the computed value. The residual motor torque is known from design data for any particular motor and is normally available from the motor manufacturer.

By using the calculated value of torque developed by ECM 15 in moving a volume of air through system 11, and knowing the average speed of blower means 13 over the range utilized in computing the torque, a detemination can be made of the volume of air flowed by blower means 13 for that period. This determination can be made by reference to data available from the fan manufacturer which provides a flow rate for that particular fan as a function of torque and fan speed. In the preferred embodiment, this data is stored in a look-up table format in a read only memory (not shown) in the microcomputer referred to above. The torque and speed values are appropriately utilized as pointers to enter the read only memory and subtract the values corresponding to the volume of air flowed for those torque speed values. Utilization of a look-up table for extracting this type of data is well known in the art. As is well known, rather than using those values as a pointer to identify the flow volume for air, the values may be utilized as addressed directly, alternatively, the system could be implemented using gate array devices that function in the same manner. An exemplary form of a manufacturers data chart illustrating the flow rate for a fan as a function of torque and fan speed is shown in FIG. 5. It will be noted that this chart plots a double set of curves, one set of curves corresponding to torque values and a second set of curves corresponding to fan speed. the X-axis of this set of curves sets out the flow rate for the fan in hundreds of cubic feet per minute (CFM). The Y-axis illustrates static pressure of air at the blower means 13. The chart can be read by entering at a given torque value and following the torque curve to its intersection with an appropriate speed curve for the fan. The intersection of the torque and speed curves will give both the static pressure value and a CFM value for those particular values of speed and torque.

The determined value of the flow rate or volume of air being moved through system 11 is then compared to the desired flow rate for determining the difference therebetween. The microcomputer utilizes this information to adjust the operation of commutation circuit 41 of FIG. 3 in order to control the operation of ECM 15 in such a manner as to cause its speed to be adjusted whereby the flow rate may be either increased or decreased as necessary to reduce the difference between the measured or determined value and desired value.

The operations of determining the flow rate by periodically deenergizing winding stages 23A, 23B, 23C of ECM 15 may be done on a cyclical basis as often as is necessary in order to maintain a flow rate at the desired value. Typically, a program will be established within the microcomputer to set the cycles at which the computations are performed on a regular basis. An exemplary ECM system utilizing a microcomputer is shown and described in U.S. Pat. No. 4,449,079 issued May 15, 1984, which is herein incorporated by reference.

Figure 4:
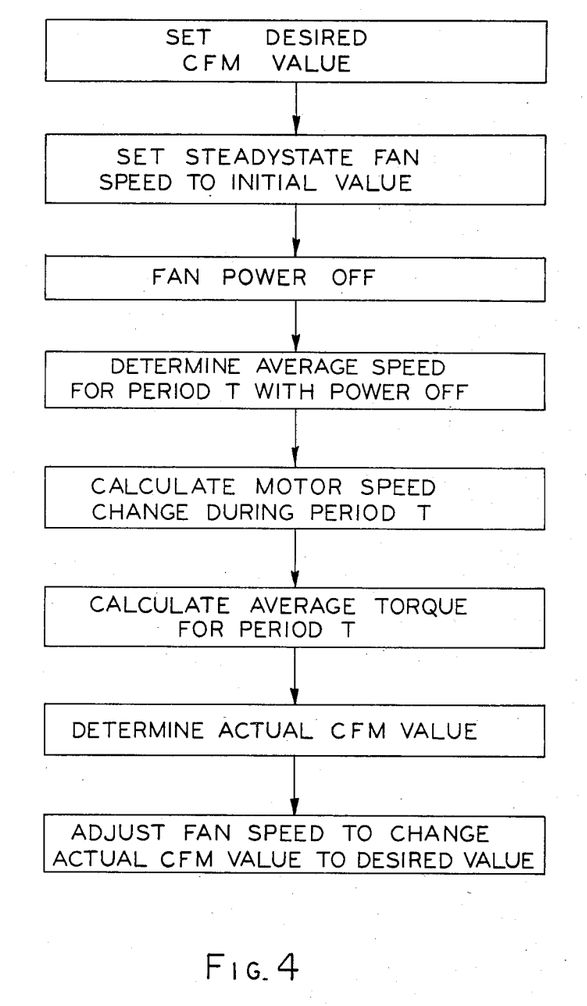
FIG. 4 is a diagrammatic view of a flow chart showing the operation of the apparatus of FIG. 1 and illustrating principles which may be practiced in a method in one form of the invention for determining torque of an electronically commutated motor arranged to drive a blower means for flowing air through a contained space.

Turning now to FIG. 4, there is illustrated a flow chart for use with the above described ECM control 35 for implementing the present invention. As shown, the first step in operating the system is to establish a desired flow rate or CFM for system 11. This value of CFM may be provided as a manual input to control 35 and is stored in the microcomputer located therein. When control 35 is energized, power is applied to the ECM and an initial steady state speed of fan 13 is attained by the system. The initial value of fan speed is a preselected value which may provide an air flow above or below the desired value. Once the microcomputer has detected that the fan has reached a steady state and speed, the program within the microcomputer deenergizes the power to the ECM winding stages 23A, 23B and 23C as is indicated by the block labelled "fan power off". The microcomputer then allows the fan to coast for a predetermined number of commutation pulses. The time period T for obtaining the predetermined number of commutation pulses such as, for example, 36 pulses, is determined by the microcomputer. Since the initial or steady state fan speed was known, the average speed during the predetermined or measured time period can be determined based upon the time that is required for the fan to slow or generate the predetermined number of commutation pulses. It should be noted that the commutation pulses are detected by position sensing circuit 51 and a predetermined number of pulses may be set by the microcomputer whereby the time period T will be a variable time period depending upon the load or static pressure imposed on the fan and the rate at which the fan decelerates. However, the microcomputer includes timing circuits which enable it to keep track of the length of time required for a predetermined number of commutation pulses to be generated. The microcomputer uses that information to determine the average speed during the time interval T.

As is shown, the next step in the process is to actually determine the deceleration or motor speed change during the time period T. As will be apparent, the motor speed change may be obtained by subtracting the final speed at the end of the time period T from the initial steady state speed. In practice, this may be accomplished by merely subtracting the number of commutation pulses occuring at the final speed from the number of commutation pulses occuring at the initial speed. The average torque is then determined by multiplying the average speed during period T by the predetermined value of inertia for the motor and fan combination. The torque imparted to the fan by virtue of the static pressure and volume of air being moved by the fan is then determined by subtracting the residual motor torque from the calculated torque value.

As is indicated, the next step is to determine the CFM and this is done by utilizing the calculated torque value and the average motor speed during the period for which the torque was calculated as values for obtaining CFM from the manufacturers data as previously described. The torque speed values may be utilized as simply input values to a look-up table from which the CFM value can be determined. Knowing the measured value of CFM and the previously set desired value, the microcomputer can then adjust the fan speed to change the actual CFM to the desired value in a manner well known in the art.

With reference again to the drawing in general and recapitulating at least in part with respect to the foregoing, there is illustrated in one form of the invention a method of determining torque of ECM 15 arranged to drive blower means 13 for flowing air through a contained space and with the ECM and the blower means having a combined predetermined inertia (FIG. 1-5). In practicing this method, power is applied to ECM 15, and thereby blower means 13 is accelerated to a predetermined speed (FIGS. 3 and 4). The power is then removed from ECM 15, and thereby blower means 13 is decelerated. The deceleration of blower means 13 is measured, and the torque of ECM 15 is determined from the measured deceleration.

Additionally, apparatus 71 is provided in one form of the invention for establishing a preferred rate of flow of air through at least a part of system 11 for conditioning the temperature of the air (FIG. 1). Apparatus 71 has a heat exchanger 73, and fan means 13 is rotatable for flowing the air past or over the heat exchanger through the at least part of the system. ECM 15 includes stationary assembly 19 having multi-stage winding arrangement 21 with winding stages 23A, 23B, 23C adapted to be electronically commutated in at least one preselected sequence and at least a plurality of commutation rates, and permanent magnet rotor means 27 associated in magnetic coupling relation with the winding stages is operable generally for rotatably driving fan means 13 in response to the electronic commutation of the winding stages in the at least one preselected sequence. (FIGS. 2 and 3). Means, such as commutation circuit 41, is provided for electronically commutating at least some of winding stages 23A, 23B, 23C in at least one preselected sequence and in one of the commutation rates to effect conjoint rotation of permanent magnet rotor means 27 and fan means 13 to at least a preselected speed (FIG. 3). Means is provided for terminating the electronic commutation of the at least some winding stages 23A, 23B, 23C for a measured period of time thereby to interrupt the selective magnetic coupling relation of permanent magnet rotor means 27 with the winding stages and effect deceleration of the permanent magnet rotor means and the fan means during the measured period of time. Means is also provided for determining the deceleration of at least one of permanent magnet rotor means 27 and fan means 13 during at least a part of the measured period of time and for ascertaining the preferred rate of flow of the air past heat exchanger 73 at least in part from the determination of the deceleration of the permanent magnet rotor means and the fan means during the at least part of the measured period of time (FIGS. 1, 3 and 4).

More particularly and with specific reference FIG. 1, apparatus 71 has a housing or casing 75 associated with suitable duct work 77 of system 11 for container defining a space for the flow of air from fan means 13 over heat exchanger 73 to a vent or register 79 or the like for controlling the passage of the air from system 11 into a room or space in a building (not shown). A fire box 79 of a furnace or the like for instance (not shown) is connected at 81 to heat exchanger 73 for providing a heating medium to heat exchanger 73 which is in heat exchange relation with the air being passed over it. Although apparatus 71 is illustrated herein as a furnace, it is contemplated that other apparatus, such as a central air conditioning unit, a heat pump unit, or an automotive air conditioner unit or the like for instance, may be utilized within the scope of the invention so as to meet at least some of the objects thereof.

What is claimed is:

1. A method of establishing a preferred rate of flow of air through at least a part of a system for conditioning the air regardless of the static pressure of the system, the system having an electronically commutated motor and also a fan means rotatably operable for flowing the air through the at least part of the system with the volume of air flowed by the fan means being a function of the speed and torque thereof, the electronically commutated motor including a stationary assembly having a multi-stage winding arrangement with a plurality of winding stages adapted to be electronically commutated in at least one preselected sequence and in a plurality of commutations rates, and permanent magnet rotor means rotatably associated with the stationary assembly and operable generally for rotatably driving the fan means, the permanent magnet rotor means and the fan means having a combined inertia and the electronically commutated motor having a residual torque, the method comprising the steps of:

determining the combined inertia of the permanent magnet rotor means and the fan means and the residual torque of the electronically commutated motor, respectively;

electronically commutating at least some of the winding stages of the electronically commutated motor in the at least one preselected sequence and in one of the commutation rates and associating the permanent magnet rotor means in selective magnetic coupling relation with the at least some electronically commutated winding stages, respectively;

rotating conjointly the permanent magnet rotor means and the fan means driven thereby to at least a preselected speed in response to the electronically commutating and associating step and measuring the speed of at least one of the permanent magnet rotor means and the fan means;

terminating the electronic commutation of the at least some winding stages for a measured period of time and interrupting thereby the selective magnetic coupling relation of the permanent magnet rotor means with the at least some winding stages;

effecting deceleration of the permanent magnet rotor means and the fan means during the measured period of time in response to the terminating and interrupting step and measuring the deceleration of the at least one of the permanent magnet rotor means and the fan means during at least a part of the measured period of time;

computating the torque imparted to the fan means from the permanent magnet rotor means during the effecting and measuring step from the following equation:

$$\text{torque} = (d \times i) - t$$

where
d = the deceleration of the at least one of the permanent magnet rotor means and the fan means;

i = the combined inertia of the permanent magnet rotor means and the fan means; and t = the residual torque of the electronically commutated motor;

determining the volume of the air flowed by the fan means as a function of its speed and torque during the effecting and measuring step; and effecting further electronic commutation of the at least some winding stages in the at least one preselected sequence and in another of the commutation rates so as to alter the speed of the permanent magnet rotor means and the fan means and adjusting thereby the torque imparted to the fan means from the permanent magnet rotor means so as to establish the preferred rate of flow of air through the at least part of the system by the fan means.

2. A method of establishing a preferred rate of flow of air through at least a part of a system for conditioning the air, the system having an electronically commutated motor and also a fan means rotatable for flowing the air through the at least part of the system, the electronically commutated motor including a stationary assembly having a multi-stage winding arrangement with a plurality of winding stages adapted to be electronically commutated in at least one preselected sequence and at a plurality of commutation rates, and permanent magnet rotor means rotatably associated with the stationary assembly and operable generally for rotatably driving the fan means, the method containing the steps of:

electronically commutating at least some of the winding stages of the electrically commutated motor in the at least one preselected sequence and in one of the commutation rates and associating the permanent magnet rotor means in selective magnetic coupling relation with the electronically commutated at least some winding stages;

rotating conjointly the permanent magnet rotor means and the fan means to at least a preselected speed in response to the electronically commutating and associating step and flowing thereby the air through the at least part of the system;

terminating the electronic commutation of the at least some winding stages for a measured period of time so as to interrupt the selective magnetic coupling relation of the permanent magnet rotor means with the at least some winding stages and effecting thereby deceleration of the permanent magnet rotor means and the fan means during the measured period of time;

determining the deceleration of at least one of the permanent magnet rotor means and the fan means during at least a part of the measured period of time and ascertaining the preferred rate of the flow of air through the at least part of the system at least in part from the determinatin of the deceleration of the permanent magnet rotor means and the fan means during the at least part of the measured period of time.

3. The method as set forth in claim 2 comprising the additional step of effecting further electronic commutation of the at least some winding stages in the at least one preselected sequence and in at least another of the commutation rates so as to alter the speed of the permanent magnet rotor means and the fan means and adjusting thereby the torque imparted to the fan means from the permanent magnet rotor means so as to establish the preferred rate of flow of air through the at least part of the system by the fan means.

4. The method as set forth in claim 2 wherein the determining and ascertaining step includes computing the torque imparted to the fan means from the permanent magnet rotor means and calculating the volume of the air flowed by the fan means as a function of its speed and torque.

5. The method as set forth in claim 4 wherein the determining and ascertaining step further includes utilizing the following equation to compute the torque imparted to the fan means from the permanent magnet rotor means:

$$torque = (d \times i) - t$$

where d = the deceleration of the permanent magnet rotor means and the fan means, i = the combined inertia of the permanent magnet rotor means and the fan means, and t = a residual torque of the electronically commutated motor.

6. A method of establishing a preferred rate of flow of air through a system for conditioning it regardless of the static pressure of the system, the system including a blower means operable generally for flowing the air through at least a part of the system, and an electronically commutated motor arranged to drive the blower means, the method comprising the steps of:

energizing the electronically commutated motor to at least a preselected speed and driving thereby the blower means to effect the flow of air through the at least part of the system;

deenergizing the electronically commutated motor for a measured period of time and effecting thereby deceleration of the electronically commutated motor and the blower means;

determining the deceleration of the electronically commutated motor and the blower means during at least a part of the measured time period and ascertaining the preferred rate of the flow of air through the system at least in part from the determination of the deceleration of the electronically commutated motor and the blower means during the at least part of the measured time period.

7. The method as set forth in claim 6 comprising the additional step of reenergizing the electronically commutated motor at another speed to drive the blower means and establishing thereby the preferred rate of flow of air through the system.

8. The method as set forth in claim 6 wherein the determining and ascertaining step includes computing the torque imparted to the blower means from the electronically commutated motor and calculating the colume of the air flowed by the blower means as a function of its speed and torque.

9. The method as set forth in claim 8 wherein the determining and ascertaining step further includes utilizing the following equation to compute the torque imparted to the blower means:

$$torque = (d \times i) - t$$

where d = the deceleration of the electronically commutated motor and the blower means;

i = a combined inertia of the electronically commutated motor and the blower means, and t = a residual torque of the electronically commutated motor.

10. The method as set forth in claim 6 wherein the electronically commutated motor includes a stationary assembly having a multi-stage winding arrangement with a plurality of winding stages adapted to be electronically commutated in at least one preselected sequence and in a plurality of commutation rates, and permanent magnet rotor means rotatably associated with the stationary assembly and operable generally for rotatably driving the blower means and wherein the energizing and driving step includes electronically commutating at least some of the winding stages in the at least one preselected sequence and in one of the commutation rates and rotating thereby the permanent magnet rotor means in selective magnetic coupling relation with the electronically commutated at least some winding stages to drive the blower means to the at least preselected speed.

11. The method as set forth in claim 10 wherein the deenergizing and effecting step includes terminating the electronic commutation of the at least some winding stages during the measured period of time so as to interrupt the selective magnetic coupling relation therewith of the permanent magnet rotor means and effecting thereby the deceleration of the permanent magnet rotor means and the blower means.

12. The method as set forth in claim 11 comprising the additional step of effecting further electronic commutation of the at least some winding stages in the at least one preselected sequence and in at least another of the commutation rates and altering thereby the rotational speed of the permanent magnet rotor means driving the blower means so as to establish the preferred rate of flow of air through the at least part of the system.

13. A method of determining torque of an electronically commutated motor arranged to drive a blower means for flowing air through a contained space, the electronically commutated motor including a stationary assembly having a multi-stage winding arrangement with a plurality of winding stages adapted to be electronically commutated in at least one preselected sequence, and a permanent magnet rotor means rotatably associated with the stationary assembly and rotatably operable for driving the blower means, the permanent magnet rotor means and the blower means having a combined inertia and the electronically commutated motor having a residual torque, the method comprising the steps of:
  electronically commutating at least some of the winding stages of the electronically commutated motor in the at least one preselected sequence and associating the permanent magnet rotor means in selective magnetic coupling relation with the electronically commutated at least some winding stages, respectively;
  rotating conjointly the permanent magnet rotor means and the blower means to at least a preselected speed in response to the electronically commutating and associating step thereby to flow the air through the contained space and measuring the speed of at least one of the permanent magnet rotor means and the blower means;
  terminating the electronic commutation of the at least some winding stages for a measured period of time and interrupting thereby the selective magnetic coupling relation of the permanent magnet rotor means with the at least some winding stages;
  effecting deceleration of the permanent magnet rotor means and the blower means during the measured period of time in response to the terminating and interrupting step and measuring the deceleration of the at least one of the permanent magnet rotor means and the blower means during at least a part of the measured period of time; and
  computing the torque imparted to the blower means from the permanent magnet rotor means during the effecting and measuring step from the following equation:

$$\text{torque} = (d \times i) - t$$

where
  d = the deceleration of the at least one of the permanent magnet rotor means and the blower means,
  i = the combined inertia of the permanent magnet rotor means and the blower means, and
  t = the residual torque of the electronically commutated motor.

14. A method of determining torque of an electronically commutated motor arranged to drive a blower means for flowing air through a contained space, the electronically commutated motor including a stationary assembly having a multi-stage winding arrangement with a plurality of winding stages adapted to be electronically commutated in at least one preselected sequence, and a permanent magnet rotor means rotatably associated with the stationary assembly and rotatably operable for driving the blower means, the method comprising the steps of:
  electronically commutating at least some of the winding stages of the electronically commutating motor in the at least one preselected sequence and rotating the permanent magnet rotor means in selective magnetic coupling relation with the electronically commutated at least some winding stages thereby to drive the blower means to a preselected speed, respectively;
  terminating the electronic commutation of the at least some winding stages for a measured time period and effecting thereby deceleration of the permanent magnet rotor means and the blower means; and
  measuring the deceleration of at least one of the permanent magnet rotor means and the blower means during at least a part of the measured time period and computing the torque of the permanent magnet rotor means at least in part from the measured deceleration.

15. The method as set forth in claim 14 wherein the electronically commutated motor has a residual torque, and the permanent magnet rotor means and the blower means have a combined inertia and wherein the measuring and computing step includes utilizing the following equation to compute the torque of the permanent magnet rotor means:

$$\text{torque} = (d \times i) - t$$

where
  d = the deceleration of the at least one of the permanent magnet rotor means and the blower means;
  i = the combined inertia of the permanent magnet rotor means and the blower means; and t = the residual torque of the electronically commutated motor.

16. The method as set forth in claim 15 comprising the preliminary step of determining the residual torque of the electronically commutated motor and the combined inertia of the permanent magnet rotor means and the blower means.

17. A method of determining torque of an electronically commutated motor arranged to drive a blower means for flowing air through a contained space, the electronically commutated motor and the blower means having a combined predetermined inertia, the method comprising the steps of:
   applying power to the electronically commutated motor and accelerating thereby the blower means to a predetermined speed;
   removing power from the electronically commutated motor and decelerating thereby the blower means; and
   measuring the deceleration of the blower means and calculating the torque of the electronically commutated motor from the measured deceleration.

18. Apparatus for establishing a preferred rate of flow of air through at least a part of a system for conditioning the air, the apparatus comprising:
   a heat exchanger;
   fan means rotatable for flowing the air past the heat exchanger through the at least part of the system;
   an electronically commutated motor including a stationary assembly having a multi-stage winding arrangement with a plurality of winding stages adapted to be electronically commutated in at least one preselected sequence and at a plurality of commutation rates, and permanent magnet rotor means associated in selective magnetic coupling relation with said winding stages and operable generally for rotatably driving said fan means in response to the electronic commutation of said winding stages in the at least one preselected sequence;
   means for electronically commutating at least some of the winding stages of said electronically commutated motor in the at least one preselected sequence and in one of the commutation rates to effect conjoint rotation of the permanent magnet rotor means and the fan means to at least a preselected speed;
   means for terminating the electronic commutation of said at least some winding stages for a measured period of time thereby to interrupt the selective magnetic coupling relation of the permanent magnet rotor means with the at least some winding stages and effect deceleration of said permanent magnet rotor means and said fan means during the measured period of time;
   means for determining the deceleration of at least one of said permanent magnet rotor means and said fan means during at least a part of the measured period of time and for ascertaining the preferred rate of the flow of air past said heat exchanger through the at least part of the system at least in part from the determination of the deceleration of said permanent magnet rotor means and said fan means during the at least part of the measured period of time.

19. Apparatus for establishing a preferred rate of flow of air through at least a part of a system for conditioning the air regardless of the static pressure of the system, the apparatus comprising:
   an electronically commutated motor and a fan means rotatably operable for flowing the air through the at least part of the system with the volume of air flowed by the fan means being a function of the speed and torque thereof, the electronically commutated motor including a stationary assembly having a multi-stage winding arrangement with a plurality of winding stages adapted to be electronically commutated in at least one preselected sequence and in a plurality of commutations rates, and permanent magnet rotor means rotatably associated with the stationary assembly and operable generally for rotatably driving the fan means, the permanent magnet rotor means and the fan means having a combined inertia and the electronically commutated motor having a residual torque;
   control means for electronically commutating at least some of the winding stages of the electronically commutated motor in the at least one preselected sequence and in one of the commutation rates for effecting conjoint rotation of the permanent magnet rotor means and the fan means driven thereby to at least a preselected speed;
   means for measuring the speed of at least one of the permanent magnet rotor means and the fan means;
   means for providing data to said control means for terminating the electronic commutation of the at least some winding stages for a measured period of time for effecting a deceleration of the fan means;
   means for measuring the deceleration of the at least one of the permanent magnet rotor means and the fan means during at least a part of the measured period of time;
   means for computing the torque imparted to the fan means from said electronically commutation motor during the measured period of time from the following equation:

$$\text{torque} = (d \times i) - t$$

where
   d = the deceleration of the at least one of the permanent magnet rotor means and the fan means;
   i = the combined inertia of the permanent magnet rotor means and the fan means; and
   t = the residual torque of the electronically commutated motor;
   means for determining the volume of the air flowed by the fan means as a function of its speed and torque during the measured period of time; and
   means for comparing the determined volume of air flowed to the preferred rate of flow and for generating signals to said control means for effecting further electronic commutation of the at least some winding stages in the at least one preselected sequence and in another of the commutation rates so as to alter the speed of the permanent magnet rotor means and the fan means and adjusting thereby the torque imparted to the fan means from the electronically commutated motor so as to establish the preferred rate of flow of air through the at least part of the system by the fan means.

* * * * *